Sept. 6, 1966 J. W. ACKLEY 3,270,966
SPRAYER NOZZLE
Filed July 15, 1964

INVENTOR.
JOHN W. ACKLEY
BY
John C. Thompson
ATTORNEY 3,270,966
SPRAYER NOZZLE
John W. Ackley, Moline, Ill., assignor to Deere & Company, Moline, Ill., a corporation of Illinois
Filed July 15, 1964, Ser. No. 382,885
6 Claims. (Cl. 239—550)

The present invention relates generally to agricultural implements and more particularly to sprayers.

One object of the present invention is to provide an improved swivel nozzle construction.

More particularly, it is an object of the present invention to provide an improved swivel nozzle construction in which the inlet and outlet body portions are substantially identical, each of the body portions being formed of a corrosion resistant plastic material such as nylon.

Another object of the present invention is the provision of novel means to prevent leakage between the swivel nozzle construction and the inlet conduit. More specifically it is an object of the present invention to provide cap means disposable about the inlet conduit means, the cap means having a bell-shaped portion which is disposable about the inlet leg portion of the plastic inlet nozzle body.

Another object of the present invention is the provision of transverse apertures in the head portions of the nozzle bodies, the transverse apertures being square in cross section, and further the provision of nut and bolt fastener means to hold the inlet and outlet body portions together, the bolt being disposable within the transverse apertures and in tangential contact with the surface of the square apertures whereby the apertures are held in alinement with each other.

A still further object of the present invention is the provision of a swivel nozzle construction of low weight, low cost, and improved operating characteristics.

These and other objects and advantages of this invention will be apparent to those skilled in the art after a consideration of the following detail description, taken in conjunction with the accompanying drawings, in which the preferred form of this invention is illustrated.

Figure 1:
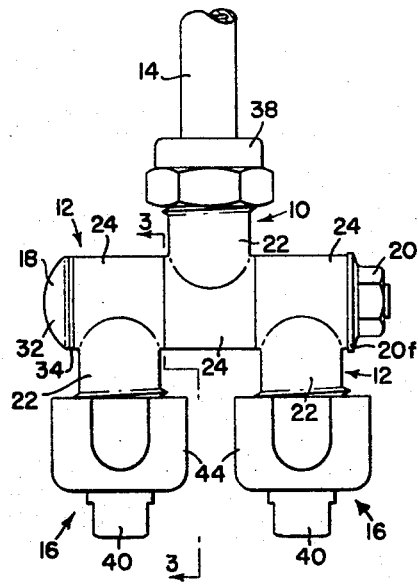
FIG. 1 is a side elevation view of the swivel nozzle construction of the present invention.

The swivel nozzle construction of the present invention is suitable for use with sprayers of the type shown in U.S. Patent No. 3,043,519 and consists of inlet and outlet nozzle body members 10 and 12 respectively. The inlet body member 10 is secured to a drop pipe or other suitable fluid conveying means 14, and each of the outlet bodies 12 carries at its outer end a nozzle tip and strainer assembly 16. The inlet and outlet bodies are held together by a bolt 18 and nut 20.

Figure 2:
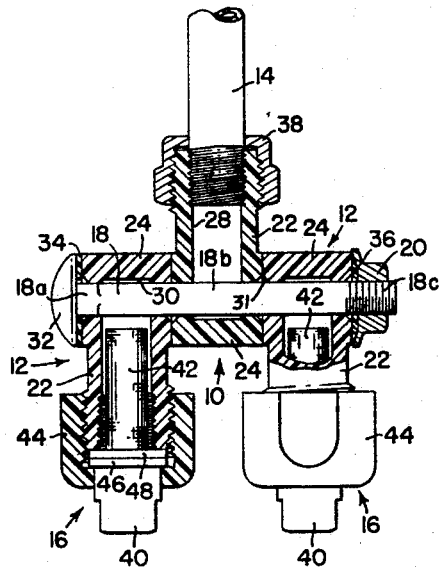
FIG. 2 is a cross sectional view of the nozzle construction shown in FIG. 1.
Figure 3:
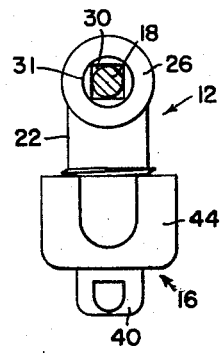
FIG. 3 is a sectional view taken along the lines 3—3 in FIG. 1.

The inlet and outlet bodies 10 and 12 are substantially identical and each body has a leg portion 22 and a transverse head portion 24, the leg portion being normal to said head portion. The outer end of the leg portion is provided with internal and external threads (as can best be seen from FIG. 2). The end surfaces 26 (FIG. 3) are parallel to each other and perpendicular to the axis of the head portion 24. Each leg portion 22 is provided with a longitudinally extending aperture 28 (FIG. 2) and a transverse aperture 30 (FIGS. 2 and 3), the surface 26 being preferably countersunk as at 31. As can best be seen from FIG. 3, the transverse aperture is square in cross section. Each of the nozzle bodies is made of a plastic material which is corrosion resistant and provides a good sealing surface when abutting against itself, such a plastic being for example nylon.

The inlet and outlet bodies are held together by a conventional carriage bolt 18 having a generally square section 18a, a round shank section 18b, and a threaded end portion 18c, the bolt being passed through the transverse aperture 30, and a nut 20 which is disposable about the threaded end 18c of the bolt. The bolt is provided with a head 32 that bears against an outlet body gasket 34 and the nut 20 bears against a similar outlet body gasket 36. The nut may be provided with a flanged portion 20f to provide additional bearing surface against the gasket 36. The nut and bolt hold the transverse head portions of the inlet and outlet bodies together with the end surfaces 26 of the head portions abutting each other, the end surfaces being held together with sufficient force that an effective seal is established. It should be noted that by the use of the aforementioned plastic material that an effective seal can be established while still permitting the outlet body to be positioned by hand to any setting desired without loosening the nut 20.

The shank of the bolt is circular in cross section, as is conventional, and the outer surfaces of the shank contact the walls of the square aperture 30. By employing a square aperture and a circular holding member, the alinement of the head portions without any sliding motion is achieved, thus and effective seal is maintained. Countersinks 31 permit flow when mating parts are rotated.

As previously mentioned each of the leg portions 22 is provided with interior and exterior threads. When a body is used as the inlet body, the interior threads engage the threads on a drop pipe 14. Applicant has found due to the high coefficient of expansion of desirable materials such as nylon that in high-temperature operations it is not possible to maintain an effective seal between the drop pipe 14 and the leg portion 22 unless means are provided to hold the leg portion against the drop pipe. To this end applicant has provided a cap 38, of the same material as the drop pipe 14, preferably brass, the cap being slidably disposed about the drop pipe 14. To maintain the brass cap in tight engagement with the leg portion 22, the cap is provided with internal threads (no number) that matingly engage the external threads on the leg portion 22. Thus, in high-temperature applications, the nylon or other plastic leg portion is held tightly between the brass cap 38 and the brass drop pipe 14 since the drop pipe and cap member have the same coefficient of expansion.

Mounted at the ends of the leg portions of the outlet bodies 12 are generally conventional nozzle tip and strainer assemblies 16. Each assembly 16 includes a spray tip 40, a strainer unit 42 and a spray tip cap 44 which is adapted to engage the flange 46 of the spray tip and to hold it in abutting relationship with the flange 48 of the strainer unit 42, the flange 48 being held in turn against the end of the leg portion 22. The spray tip cap 44 is provided with internal threads (no number) that matingly engage with the external threads on the leg portion 22.

By employing the foregoing body construction, it is possible to eliminate the necessity for producing and maintaining an inventory of separate inlet bodies and outlet bodies. Furthermore, improved sealing characteristics are employed by the utilization of the particular material of the nozzle body and also by the employment of a bolt having a round cross section that engages a transverse aperture having a square cross section since alinement of the transverse apertures is positively maintained. Also, it should be noted that leakage of spray material between the inlet 14 and the inlet leg portion 22 under high temperature and pressure conditions is substantially eliminated by the employment of the brass cap 38.

While I have shown and described above the preferred structure in which the principles of the present invention have been incorporated it is to be understood that my invention is not to be limited to the particular details, shown and described above, but that, in fact, widely different means may be employed in the practice of the broader aspects of my invention.

I claim:

1. A spray nozzle construction comprising: a plurality of substantially identical nylon bodies including one inlet body and at least one outlet body, each of the bodies being of generally T-shaped configuration having a leg portion and a transverse head portion, a transverse aperture extending entirely through the head portion and a longitudinal aperture extending entirely through the leg portion and extending into communication with said transverse aperture, the leg portion of each of the bodies being provided with a threaded external surface and a threaded internal surface, a drop pipe threaded at one end and matingly engaged with the threaded internal surface of the inlet body, fastener means holding the head portions of said inlet and outlet bodies together whereby the transverse apertures are in communication with each other, spray tip means, and spray tip cap means holding said spray tip means at the end of said outlet body means, said spray tip cap means including an internally threaded bell-shaped portion matingly engaged with said external threads on said outlet bodies.

2. A spray nozzle construction comprising: a plurality of nozzle bodies including one inlet body and at least one outlet body, each of the bodies being of generally T-shaped configuration having a leg portion and a transverse head portion, said leg portion being normal to said head portion, a transverse aperture extending entirely through the head portion and a longitudinal aperture extending entirely through the leg portion and extending into communication with said transverse aperture, said transverse aperture being square in cross section, the end surfaces of the transverse head portion being parallel to each other and to the axis of the leg, fastener means holding the head portion of said inlet and outlet bodies together whereby the transverse apertures are in communication with each other; said fastener means including a bolt passing through said transverse apertures of said inlet and outlet bodies, said bolt being round in cross section and contacting the surfaces of the square apertures whereby the transverse apertures are held in alignment with each other, and spray tip means disposed at the end of the leg portion of said outlet body means.

3. A spray tip nozzle construction comprising: a plurality of substantially identical nozzle bodies including one inlet body and at least one outlet body, each of the bodies being of generally T-shaped configuration having a leg portion and a transverse head portion, a transverse aperture extending entirely through the head portion and a longitudinal aperture extending entirely through the leg portion and extending into communication with said transverse aperture, the leg portion of each of said nozzle bodies being provided with a threaded external surface and a threaded internal surface, a drop pipe threaded at one end and matingly engaged with the threaded internal surface of the inlet body, apertured cap means slidably disposed over said drop pipe and having an internally threaded bell-shaped portion matingly engaged with the external threads on the inner body unit, fastener means holding the head portions of said inlet and outlet bodies together whereby the transverse apertures are in communication with each other, spray tip means, and spray tip cap means holding said spray tip means at the end of said outlet body means, said spray tip cap means including an internally threaded bell-shaped portion matingly engaged with said external threads on said outlet body portions.

4. A spray nozzle construction comprising: a plurality of nozzle bodies including one inlet body and at least one outlet body, each of the bodies being of generally T-shaped configuration having a leg portion and a transverse head portion, said leg portion being normal to said head portion, a transverse aperture extending entirely through the head portion and a longitudinal aperture extending entirely through the leg portion and extending into communication with said transverse aperture, said transverse aperture being square in cross section, the end surfaces of the transverse head portion being parallel to each other and to the axis of the leg portion of the inlet body being provided with a threaded external surface and a threaded internal surface, a drop pipe threaded at one end and matingly engaged with the threaded internal surface of the inlet body, apertured cap means slidably disposed about said drop pipe and having an internally threaded bell-shaped portion matingly engaged with the external threads on the inlet body fastener means holding the head portion of said inlet and outlet bodies together whereby the transverse apertures are in communication with each other, said fastener means including a bolt passing through said transverse aperture of said inlet and outlet bodies, said bolt being round in cross section and contacting the surfaces of the square apertures whereby the transverse apertures are held in alignment with each other and spray tip means disposed at the end of the leg portion of said outlet body means.

5. A spray nozzle construction comprising: a plurality of substantially identical nylon body portions including an inlet body and at least one outlet body, each of the bodies being of generally T-shaped configuration having a leg portion and a transverse head portion, said leg portion being normal to said head portion, a transverse aperture extending entirely through the head portion and a longitudinal aperture extending entirely through the leg portion and extending into communication with said transverse aperture, said aperture being square in cross section, the end surfaces of the transverse head portion being parallel to each other and to the axis of the leg, the leg portion of each of the bodies being provided with a threaded external surface and a threaded internal surface, a drop pipe threaded at one end and matingly engaged with the threaded internal surface of the inlet body, fastener means holding the head portion of said inlet and outlet bodies together whereby the transverse apertures are in communication with each other, said fastener means including a bolt passing through said transverse apertures of said inlet and outlet bodies, said bolt being round in cross section and contacting the surfaces of the square apertures, spray tip means, and spray tip cap means holding said spray tip means at the end of said outlet body means, said spray tip cap means including an internally threaded bell-shaped portion matingly engaged with the external threads on said outlet bodies.

6. A spray nozzle construction comprising: a plurality of substantially identical nylon bodies including one inlet body and at least one outlet body, each of the bodies being of generally T-shaped configuration having a leg portion and a transverse head portion, said leg portion being normal to said head portion, a transverse aperture extending entirely through the head portion and a longitudinal aperture extending entirely through said leg portion, and extending into communication with said transverse aperture, said transverse aperture being square in cross section, the end surfaces of the transverse head portion being parallel to each other and to the axis of the leg, the leg portion of each of the bodies being provided with a threaded external surface and a threaded internal surface, a drop pipe threaded at one end and matingly engaged with the threaded internal surface of the inlet body, brass apertured cap means slidably disposed about said drop pipe and having an internally threaded bell-shaped portion matingly engaged with the external threads on the inner body unit, bolt and nut means holding the head portion of said inlet and outlet bodies together whereby the transverse apertures are in communication with each other, said bolt means passing through the transverse apertures of said inlet and outlet bodies, said bolt being round in cross section and contacting the surfaces of the square apertures whereby the transverse apertures are held in alignment with each other, spray tip means, and spray tip cap means holding said spray tip means at the end of the leg portion of said outlet body means, said spray tip cap means including an internally threaded bell-shaped portion matingly engaged with said external threads on said outlet bodies.

References Cited by the Examiner

UNITED STATES PATENTS

| | | | |
|---|---|---|---|
| 904,673 | 12/1908 | Bideker | 239—587 X |
| 1,139,671 | 5/1915 | Goodall | 285—92 |
| 1,477,410 | 12/1923 | Wurl | 239—587 X |
| 2,683,626 | 7/1954 | Wahlin | 239—587 X |
| 2,929,566 | 3/1960 | Paasche | 285—247 X |
| 3,023,033 | 2/1962 | Koch | 285—423 X |
| 3,104,899 | 9/1963 | McKenzie | 285—423 X |
| 3,108,827 | 10/1963 | Mason | 285—423 X |

M. HENSON WOOD, Jr., *Primary Examiner.*

V. C. WILKS, *Assistant Examiner.*